(12) United States Patent
Li et al.

(10) Patent No.: US 7,635,028 B2
(45) Date of Patent: Dec. 22, 2009

(54) ACIDIC INTERNAL BREAKER FOR VISCOELASTIC SURFACTANT FLUIDS IN BRINE

(75) Inventors: Leiming Li, Sugar Land, TX (US); Lijun Lin, Sugar Land, TX (US); Carlos Abad, Richmond, TX (US); Toan Bui, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 265 days.

(21) Appl. No.: 11/770,442

(22) Filed: Jun. 28, 2007

(65) Prior Publication Data

US 2008/0066916 A1 Mar. 20, 2008

Related U.S. Application Data

(63) Continuation-in-part of application No. 11/532,565, filed on Sep. 18, 2006.

(51) Int. Cl.
*E21B 43/25* (2006.01)
*E21B 43/26* (2006.01)
*C09K 8/60* (2006.01)
*C09K 8/70* (2006.01)

(52) U.S. Cl. ............... 166/300; 166/308.2; 166/308.3; 507/244; 507/245; 507/259; 507/267; 507/277; 507/921

(58) Field of Classification Search ................. 166/278, 166/300, 308.2, 308.3, 902; 507/211, 244, 507/245, 259, 267, 277, 921
See application file for complete search history.

(56) References Cited

U.S. PATENT DOCUMENTS 5,501,275 A 3/1996 Card
5,551,516 A 9/1996 Norman
5,782,300 A 7/1998 James
5,964,295 A 10/1999 Brown
5,979,555 A 11/1999 Gadberry
5,979,557 A 11/1999 Card
6,035,936 A 3/2000 Whalen
6,138,760 A 10/2000 Lopez
6,140,277 A 10/2000 Tibbles
6,258,859 B1 7/2001 Dahayanake
6,306,800 B1 10/2001 Samuels
6,399,546 B1 6/2002 Chang
6,435,277 B1 8/2002 Qu
6,509,301 B1 1/2003 Vollmer
6,637,517 B2 10/2003 Samuel
6,667,280 B2 12/2003 Chang
7,028,775 B2 4/2006 Fu (Continued)

FOREIGN PATENT DOCUMENTS

GB 2366307 6/2002

(Continued)

*Primary Examiner*—George Suchfield
(74) *Attorney, Agent, or Firm*—Dave Cate; Robin Nava; Charlotte Rutherford

(57) ABSTRACT

Compositions and methods are given for delayed breaking of viscoelastic surfactant gels inside formation pores, particularly for use in hydraulic fracturing. Breaking inside formation pores is accomplished without mechanical intervention or use of a second fluid. Acidic internal breakers such as sulfuric acid and nitric acid are used. The break may be accelerated, for example with a free radical propagating species, or retarded, for example with an oxygen scavenger.

11 Claims, 11 Drawing Sheets

U.S. PATENT DOCUMENTS

| | | |
|---|---|---|
| 7,052,901 B2 | 5/2006 | Crews |
| 2003/0119680 A1 | 6/2003 | Chang |
| 2003/0139298 A1* | 7/2003 | Fu et al. .................. 507/200 |
| 2004/0009880 A1* | 1/2004 | Fu .......................... 507/200 |
| 2004/0094301 A1* | 5/2004 | Hughes et al. ......... 166/308.2 |
| 2005/0037928 A1 | 2/2005 | Qu |
| 2005/0121233 A1 | 6/2005 | Frith |
| 2006/0041028 A1 | 2/2006 | Crews |
| 2006/0258541 A1 | 11/2006 | Crews |
| 2007/0056737 A1 | 3/2007 | Crews |

FOREIGN PATENT DOCUMENTS

| | | |
|---|---|---|
| WO | 0211874 | 2/2002 |
| WO | 02064945 | 8/2002 |
| WO | 2005121273 | 12/2005 |

* cited by examiner

ACIDIC INTERNAL BREAKER FOR VISCOELASTIC SURFACTANT FLUIDS IN BRINE

CROSS-REFERENCE TO RELATED APPLICATIONS

This application a continuation-in-part of copending application, 11/532,565, entitled "Oxidative Internal Breaker for Viscoelastic Surfactant Fluids", filed Sep. 18, 2006. This application is related to copending application entitled "Oxidative Internal Breaker System with Breaking Activators for Viscoelastic Surfactant Fluids", filed Jun. 28, 2007 (11/770,313). The application is also related to copending application 11/532,553, entitled "Internal Breaker for Oilfield Treatments," inventors Jesse Lee, Philip Sullivan, Erik Nelson, Yiyan Chen, Carlos Abad, Belgin Baser, and Lijun Lin, filed Sep. 18, 2006. This application is related to copending application 11/532,559, entitled "Internal Breaker for Oilfield Fluids," inventors Philip Sullivan, Yiyan Chen, Belgin Baser, Carlos Abad, Mehmet Parlar, and Gregory Kubala, filed Sep. 18, 2006. This application is also related to copending application 11/532,705, entitled "Method for Limiting Leakoff and Damage in Hydraulic Fractures,"inventors Richard Hutchins, Marie Dessinges, and Carlos Abad, filed Sep. 18, 2006. These applications are all assigned to the assignee of the present application and are hereby incorporated in their entirety.

Background of the Invention

The invention relates to recovery of oil and gas from wells, and more particularly to breaking fluids inside formation pores when using viscoelastic surfactant fluid systems (VES's) as carrier fluids and treatment fluids.

There are many applications in which breakers are needed to decrease the viscosity of treatment fluids, such as fracturing, gravel packing, and acidizing fluids, viscosified with polymers or crosslinked polymers or viscoelastic surfactants. Most commonly, these breakers act in fluids that are in gravel packs or fractures; some breakers can work in fluids in formation pores. Breakers decrease viscosity by degrading polymers or crosslinks when the viscosifiers are polymers or crosslinked polymers. Breakers decrease viscosity by degrading surfactants or destroying micelles when viscosifiers are viscoelastic surfactant fluid systems. Breakers can be solids, for example granules or encapsulated materials, that do not enter the formation.

There is sometimes a need to break viscous fluids within the pores of formations, for example when viscous fluids enter formations during fracturing, gravel packing, acidizing, matrix dissolution, lost circulation treatments, scale squeezes, and the like. Breakers that are effective inside formations will be called internal breakers here. These fluids that enter the formation may be main treatment fluids (such as fracturing fluids) or they may be secondary fluids (such as flushes or diversion fluids such as viscoelastic diverting acids). Typically it is necessary that the break be delayed, that is that the breaker not act until after the fluid has performed its function.

The current practice to improve clean-up of VES fluids in matrices is to use pre-flush or post-flush fluids to dilute the system or to contact the system with a breaker. The major disadvantage of the use pre-flush or post-flush fluids is their limited interaction with the VES fluid due to the small interface between the two fluids. The efficiency of this breaking mechanism depends upon diffusion, which is slow in highly viscous fluids. Furthermore, the volumes of the flushes can be high.

Compositions and treatment methods using a delayed internal breaker, that acts without mechanical or chemical action by the operator, would be of value. It would be desirable to have a number of such materials so that they could be used under different subterranean conditions, for example different temperatures and different formation fluid chemistries.

It has now been discovered that certain acids or the combinations of certain salt(s) and acid(s) will perform as internal breakers and will allow fluid design with pre-selectable timing for breaking of the fluid.

SUMMARY OF THE INVENTION

The composition of the invention is an oilfield treatment composition containing an aqueous fluid, a non-polymeric viscosifier and an acidic material or compound.

In one embodiment, the composition comprises an oilfield treatment composition containing an aqueous fluid, a non-polymeric viscosifier and an acidic internal breaker in brines that contain substantially no divalent cations, such as magnesium ion, zinc ions or calcium ion ($Ca^{2+}$). Useful acidic internal breakers for such brines include sulfuric acid, nitric acid, sulfates in combination with acids, and nitrates in combination with acids.

In another embodiment, the composition comprises a non-polymeric viscosifier and an acidic internal breaker in an oilfield treatment composition containing an aqueous fluid, a non-polymeric viscosifier and a brine which contain divalent cations such as $Ca^{2+}$, $Mg^{2+}$ or $Zn^{2+}$. Useful acidic internal breakers for these fluids include, but not limited to nitric acid, nitrates in combination with acids, hydrochloric acid, acetic acid, and chloride or acetates with acids.

In yet another embodiment, the non-polymeric viscosifier is a viscoelastic surfactant, for example a zwitterionic surfactant, for example a betaine, or an amidoamine oxide.

In another embodiment, the oilfield treatment composition further comprises a corrosion inhibitor. Such inclusion will protect the formation and equipment from the corrosive properties of the acidic breaker as well as any other corrosive ingredient.

Another embodiment of the invention is a method of treating a subterranean formation penetrated by a wellbore comprising a) injecting into the pores of the formation an aqueous gel comprising a non-polymeric viscosifier, an acidic internal breaker soluble in the gel, and b) allowing said gel to lose viscosity gradually in the pores after the injection.

Another embodiment is a method of treating a subterranean formation penetrated by a wellbore comprising a) injecting into the pores of the formation an aqueous gel comprising a non-polymeric viscosifier, an acidic internal breaker soluble in the gel, wherein said breaker is selected from the group consisting of certain mineral acids, and b) allowing said gel to lose viscosity gradually in the pores after the injection.

Another embodiment is a method of treating a subterranean formation penetrated by a wellbore comprising a) injecting into the pores of the formation an aqueous gel comprising a non-polymeric viscosifier, an acidic internal breaker soluble in the gel, wherein said breaker is selected from the group consisting of certain organic acids and latent acids, and b) allowing said gel to lose viscosity gradually in the pores after the injection.

DETAILED DESCRIPTION OF THE INVENTION

Figure 1:
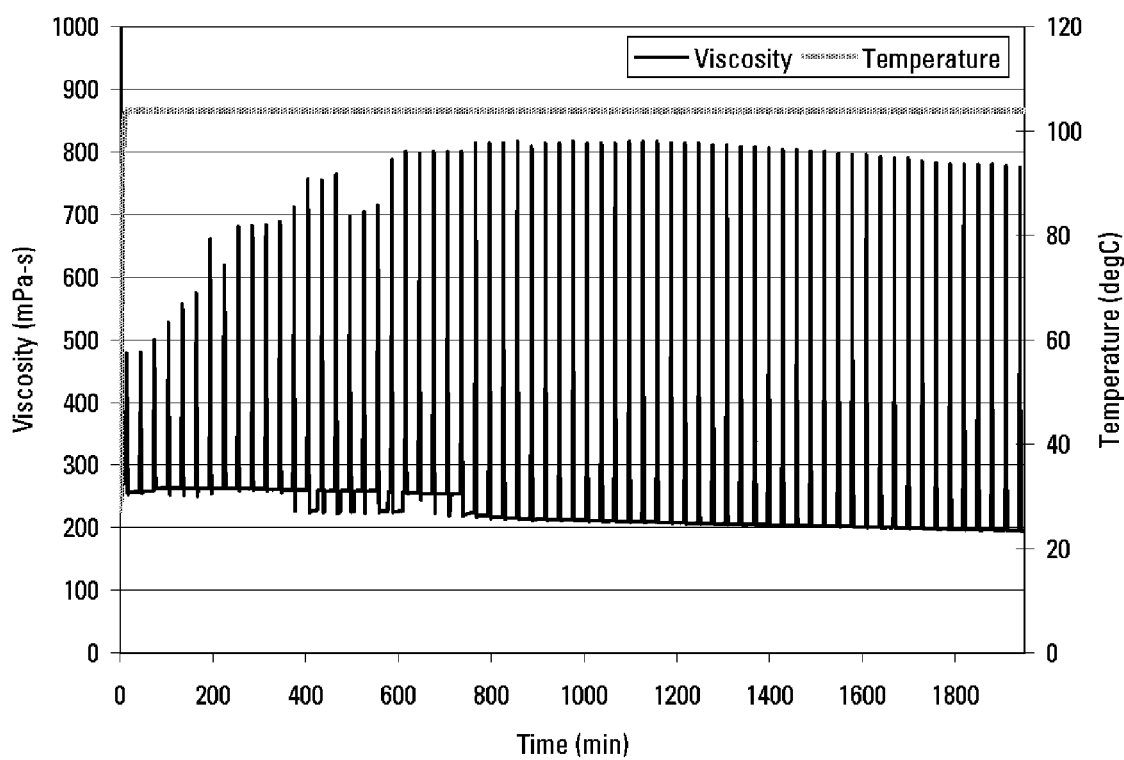
FIG. 1 shows the viscosity vs. time of a base VES fluid containing 1.39 kg/L CaCl2 brine, 6.5 vol % aqueous solution of erucic amidopropyl dimethyl betaine, and 0.2 vol % 2-Butoxyethanol with no additives.

For viscosified fluids used in oilfield treatments, it is important that there be a mechanism by which the viscosity can be reduced (that is, the fluid can be broken). Typically, breakers are added to the fluid. Typically, the action of the breaker is delayed or requires a trigger such as crushing of encapsulated breakers, so that the fluid may perform its function before the break occurs. Proper placement is an important feature for any breaker; it must be with the fluid that is to be broken. Once a fluid invades a formation, most conventional breakers (such as encapsulated oxidizing agents) cannot clean it up. Subsequently adding another fluid will be inefficient because of the poor fluid-to-fluid contact.

Oxidizing agents have been tried in the past as breakers for fluids viscosified with non-polymeric viscosifying agents, but without success. U.S. Patent Application No. 2006-0041028 describes metal-mediated viscosity reduction of viscoelastic surfactant fluids and states in paragraph [0007] that "Conventional enzymes and oxidizers have not been found to act and degrade the surfactant molecules or the viscous micelle structures they form." U.S. Patent Application No. 2005-0037928 "Method of Using Viscoelastic Vesicular Fluids to Enhance Productivity of Formations" discloses vesicular aqueous viscoelastic surfactant based fluids that contain a surfactant, a quaternary amine polyelectrolyte, and a non-aqueous solvent. In the specification, these materials are repeatedly distinguished from fluids made with worm-like micelles, such as those fluids described in U.S. Pat. No. 6,435,277. The application discloses that the vesicular fluids are sensitive to pH and that they can be broken in the presence of acid. It further teaches that they may be broken by oxidative breakers. More specifically, it teaches that oxidizers may be the only added "breaker" when the fluid is used as a diverter of acid treatments because the fluid will come in contact with acid, but in fracturing fluids the oxidative breaker may only be used in combination with acid-releasing agents, and in fact the acid-releasing agents are suitable breakers alone. In contrast to these teachings, we have found that oxidizing agents may be used as breakers of VES fluids; the oxidizers are readily soluble in the VES fluid, and the break is activated by increasing temperature.

The invention will be described primarily in terms of hydraulic fracturing, gravel packing, acidizing, and fracture acidizing, although it is to be understood that the invention may be used in many other ways, for example many other oilfield treatments. In hydraulic fracturing, most of the injected fracturing fluid contains a proppant such as sand or synthetic ceramic beads, so that when the pressure is released the proppant is trapped between the fracture faces and prevents the fracture from completely closing, thus leaving a flowpath open. The injected fracturing fluid is normally viscosified. Increased viscosity results in formation of a wider fracture, thus a larger flowpath. A minimal viscosity is also required to transport adequate amounts of proppant; the actual viscosity required depends primarily upon the fluid flow rate and the density of the proppant. In a typical fracturing process, such as hydraulic fracturing with aqueous fluids, the fracture is initiated by first pumping a high viscosity fluid with good to moderate leak-off properties, and typically no proppant, into the formation. This initial fluid, typically referred to as a "pad", is usually followed by a second fluid (fracturing fluid) of similar viscosity carrying an initially low concentration and then a gradually increasing concentration of proppant into the extended fracture or fractures. The pad initiates and propagates the fracture but does not need to carry proppant. All the fluids tend to "leak-off" into the formation from the fracture being created or extended. Commonly, by the end of the job the entire volume of the pad will have leaked off into the formation. This leak-off is determined and controlled by the properties of the fluid (and additives it may contain, such as fluid loss additives or FLA's), the pumping rate and pressure, and the properties of the rock. A certain amount of leak-off greater than the minimal possible may be desirable, for example a) if the intention is to place some fluid in the rock to change the rock properties or to flow back into the fracture during closure, or b) if the intention is deliberately to cause what is called a "tip screen-out", or "TSO", a condition in which the proppant forms a bridge at the some point in the fracture, stopping the lengthening of the fracture and resulting in a subsequent increase in the fracture width. In acid fracturing, the fracture fluid is an acid (or other formation dissolving fluid such as a chelant-containing fluid) and the fluid normally does not contain proppant; the fracture is held open by asperities in the fracture faces caused by differential etching of the formation material. In matrix acidizing, an acid or other formation dissolving fluid is injected below fracture pressure and the fluid enters the formation and dissolves damaging materials and/or a portion of the formation. Proper leak-off control may be critical to the success of these and other oilfield treatments. In these and many other treatment types, after the treatment it is necessary to decrease the viscosity of the fluid, i.e. to break them, and a portion of the fluid in the pores of the formation.

Certain materials may be used as delayed internal breakers for polymer-free (VES) fluid viscosifiers; the break by the oxidizing agent may be triggered naturally due to chemical or physical conditions, for example temperature or pH. It is well known that the decomposition rate constant of some radical initiators is not only temperature but also pH dependent (See, for example, "Polymer Handbook, Section II, Decomposition Rates of Organic Free Radical Initiators", J. Brandrup, and E. H. Immergut, Third Edition, Wiley Interscience.) The rate of decomposition may also be altered by appropriately selecting a counterion for the oxidizing agent, (e.g. sodium, potassium, and ammonium). The break may optionally be accelerated by using redox activators, for example sodium metabisulfite, iron (II) sulfate, reducing sugars, for example glucose and others, reducing di and trisaccharides, and reducing oligo and polysaccharides. The break may optionally be delayed, for example by the addition of oxygen scavengers, for example substituted Benzofuranones (for example Ciba Specialty Chemicals lactone HP-136), hydroxyl amines, trivalent phosphorus compounds, for example organic phosphites (and phosphonites) such as TNPP, CIBA Specialty Chemicals Irgafox® 168, CIBA Specialty Chemicals, Irgafox® P-EPQ, CIBA Specialty Chemicals, phenolic antioxidants, for example di terbutyl alkyl phenols, and others such as those of the Irganox® family such as IRGANOX® L 115, IRGANOX® L 109, IRGANOX® L 107, IRGANOX® L 1010, IRGANOX® L 1035, IRGANOX® L 1076, IRGANOX® L 1081, IRGANOX® L 1098, IRGANOX® L 1135, IRGANOX® L 1330, IRGANOX® L 3114, IRGANOX® L 245, IRGANOX® L 3114, IRGANOX® B 1411, IRGANOX® B 1412, IRGANOX® B 215, IRGANOX® B 220, IRGANOX® B 225, IRGANOX® B 311, IRGANOX® B 561, IRGANOX® B 612, IRGANOX® B 900, IRGANOX® B 921, IRGANOX® E 201, IRGANOX® E1 1291, IRGANOX® HP 2215, IRGANOX® HP 2225, IRGANOX® HP 2251, IRGANOX® HP 2341, IRGANOX® HP 2411, IRGANOX® HP 2921, IRGANOX® MD 1024, IRGANOX® PS 800, IRGANOX® PS 802, IRGANOX® XP 320, IRGANOX® XP 420, and IRGANOX® XP 620, trigonox, sulfur compounds such as sodium thiosulfate, hydroquinone, natural antioxidants, for example the natural polyphenols, such as apigenin, resveratrol, ascorbic acid and vitamin C, vitamin E (or alpha-tocopherol), such as IRGANOX® E 201 CIBA Specialty Chemicals, and also by other means if necessary. The break may also optionally be triggered by contact with another fluid, such as another injected fluid, a formation fluid, or a produced fluid such as an acid or basic preflush that will change the pH of the fluid and therefore change the kinetics of the oxidizer decomposition as well as the effect of the delay agent. Injecting another fluid to promote the break is not normally desirable because of potential costs and complexity, but is within the scope of the invention. The internal breaking effect occurs whether or not a filter cake is also formed by the addition of a fluid loss additive; the breaker may also contribute to degradation of the filter cake.

Suitable acidic internal breakers include sulfuric acid; sulfuric acid precursors such as sulfates, including but not limited to $Na_2SO_4$ and $K_2SO_4$ when combined with acids, including but not limited to HCl, also will function as the internal breakers for the viscosified fluids in a similar way as sulfuric acid; suitable acidic internal breakers also include nitric acid or nitrates in combination with acids, hydrochloric acid or chlorides in combination with acids, and acetic acid or acetates in combination with acids. For brines containing calcium, magnesium, zinc and other divalent ions, useful acidic internal breakers are such that they do not react adversely with these ions to lose breaking function. The breakers include nitric acid or nitrates in combination with acids, hydrochloric acid or chlorides in combination with acids, and acetic acid or acetates in combination with acids.

Without wishing to be bound by theory, it is believed possible that the acidic internal breaker slowly disrupts inter-micelle and/or intra-micelle (and/or other molecular self-assemblies) binding forces that enable the formation and retention of the viscosified fluids.

The acidic internal breakers may cause a decrease in viscosity immediately or may only do so after the passage of a few minutes or hours, or even many hours, but will still cause a complete break. The breaking time may be controlled by selection of the amount and type of acidic internal breaker to be added to the fluid. Useful amounts of breakers depend upon the specific breaker selected, and such factors as temperature of the formation, but typically range from about 0.005 wt % to about 5 wt % of the fluid, preferably from about 0.01 wt % to about 1 wt % of the fluid, more preferably from about 0.02 wt % to about 0.5 wt % of the fluid. Time of break is generally reduced at higher percentages. Temperature can also affect the time required for the fluid to completely break to a water-like viscosity. One skilled in the art can, by review of the examples and reasonable experimentation, determine what ranges are useful for the time of break desired in the operational temperature range.

Should it be desirable for the breakers or the breakers to be coated to delay breaking action, the coating can be done by any known process. Two main types of coating process, top spray and bottom spray, are characterized by the location of the spray nozzle at the bottom or the top of a fluidized bed of solid particles. The nozzle sprays an atomized flow of coating solution while the particles are suspended in the fluidizing air stream that carries the particles past the spray nozzle. The particles then collide with the atomized coating material as they are carried away from the nozzle in a cyclic flow. The temperature of the fluidizing air is set to evaporate solution or suspension liquid media or solidify the coating material shortly after colliding with the particles. The solidified coating materials will cover the particles gradually. This process is continued until each particle is coated uniformly to the desired coating thickness.

The properties of such coated particles can be tuned with the coating formulation, processing conditions, and layering with different coating materials. The choice of material will depend on a variety of factors such as the physical and chemical properties of the material being employed. Coating material can be from one of these categories: aqueous and organic solutions, dispersions, and hot melts. Non-limiting examples include acrylics, halocarbon, polyvinyl alcohol, Aquacoat® aqueous dispersions, hydrocarbon resins, polyvinyl chloride, Aquateric® enteric coatings, HPC, polyvinylacetate phthalate, HPMC, polyvinylidene chloride, HPMCP, proteins, Kynar®, fluoroplastics, rubber (natural or synthetic), caseinates, maltodextrins, shellac, chlorinated rubber, silicone, Coateric® coatings, microcrystalline wax, starches, coating butters, milk solids, stearines, Daran® latex, molasses, sucrose, dextrins, nylon, surfactants, Opadry® coating systems, Surelease® coating systems, enterics, Paraffin wax, Teflon® fluorocarbons, Eudragits® polymethacrylates, phenolics, waxes, ethoxylated vinyl alcohol, vinyl alcohol copolymer, polylactides, zein, fats, polyamino acids, fatty acids, polyethylene gelatin, polyethylene glycol, glycerides, polyvinyl acetate, vegetable gums and polyvinyl pyrrolidone.

The invention is particularly suited for use with polymer free fluids. The invention is especially useful in gravel packing and the like, where near-wellbore damage is often a particularly serious problem. The invention makes it possible to treat wells previously eliminated as candidates due to the low fluid efficiency (high leak-off) that would have been expected. The acidic internal breakers may be used as an alternative to fluid loss additives, especially when filter cakes are undesirable; instead of minimizing fluid loss, the fluid loss may be accepted and the leaked-off fluid broken. Viscosified fluids containing acidic internal breakers may also function as a self-destructing diverting agent. They may also be used in kill pills, which can be difficult to break because mechanisms often available for breaking (such as crushing of encapsulated materials, or later addition of another component) cannot be used with kill pills.

In treatments that typically include multiple stages, such as most hydraulic fracturing, acid fracturing, frac-packing, and gravel packing embodiments, the acidic internal breaker may be added in the pad, throughout the treatment or to only some of the stages, such as some of the proppant, gravel, acid, or diversion stages. The acidic internal breakers are particularly useful in hydraulic fracturing, frac-packing, and gravel packing because mechanical removal methods are impossible and methods involving contacting the additive with an additional fluid are not always practical. The compositions and methods of the invention are also particularly useful in cases where it is desirable to allow a certain amount of treatment fluid to enter the formation, for example for the purpose of altering formation wettability or oil or water saturation.

Treatment fluids used with the compositions and methods of the invention typically also contain other materials such as demulsifiers, corrosion inhibitors, friction reducers, clay stabilizers, scale inhibitors, biocides, mutual solvents, surfactants, anti-foam agents, defoamers, viscosity stabilizers, iron control agents, diverters, emulsifiers, foamers, oxygen scavengers, pH control agents, buffers, and the like. Compatibility of acidic internal breakers with such additives should be checked in the laboratory. The treatments of the Invention are conducted normally; the treatment fluid and additives are transported to the site, mixed, stored, and pumped in the usual ways for the respective chemicals. When resin coated proppants (RCP's) are used, testing should be done to ensure that the RCP's and acidic internal breakers are compatible and that neither one interferes with the performance of the other; conventional natural and synthetic proppants and gravels may normally be used without testing.

The invention is carried out by considering information about the well, the formation, the fluids and additives available, and criteria for a successful treatment, and preparing an optimized plan for maximizing treatment performance according to the data and the criteria. This is usually done by analyzing the well using treatment design and evaluation software; for example, in hydraulic fracturing software, pressure gradients are combined with fracture length and height evolution algorithms, complete leak-off information, and the effects of multiple fluid injections and their temperature changes.

The optimal concentration of the acidic internal breaker can be determined by choosing the breaking time and rate and measuring the break with samples of the intended fluids under the intended formation conditions. The preferred concentration of acidic internal breakers is from about 0.005 weight % to about 10 weight %, more preferred is in the range of about 0.01 weight % to about 5 weight %, and most preferred is in the range of about 0.02 weight % to about 0.5 weight %. (It should be understood that throughout this specification, when we list or describe a concentration or amount range as being useful, or suitable, or the like, we intend that any and every concentration within the range, including the end points, is to be considered as having been stated. Furthermore, each numerical value should be read once as modified by the term "about" (unless already expressly so modified) and then read again as not so modified unless otherwise stated in context. For example, "a range of from 1 to 10" is to be read as indicating each and every possible number along the continuum between about 1 and about 10. In other words, when we express a certain range, even if we explicitly identify or refer to only a few specific data points within the range, or even to no data points within the range, it is to be understood that the inventors appreciate and understand that any and all data points within the range are to be considered to have been specified, and that the inventors have possession of the entire range and all points within the range.) Measurement, prediction, and control of breaking are familiar to those of ordinary skill in the arts of well stimulation and sand control.

If fluid loss additives are used, it is preferable, although not necessary, to use completely degradable fluid loss additives. Particularly desirable FLA's would be the "internal filter cake/matrix breaker" materials disclosed in copending U.S. patent application Ser. No. 11/532,553, entitled "Internal Breaker for Oilfield Treatments," inventors Jesse Lee, Philip Sullivan, Erik Nelson, Yiyan Chen, Carlos Abad, Belgin Baser, and Lijun Lin, filed Sep. 18, 2006. When the pad and the fracture fluid are polymer-free and any fluid loss additive is fully degradable, neither the near-wellbore formation nor the proppant bed left in the fracture after the job contains deleterious polymers or solids, as would be the case if the fracture fluid contained any polymer or if the fluid loss additive was not fully degradable. Therefore fracture conductivity is high and skin is low.

Any non-polymeric fluid, for example VES based fluid, that is compatible with the formation, the formation fluids, and the other components of the fluid, can be used in the Invention. Particularly effective non-limiting examples of fluids are those described in U.S. Pat. Nos. 5,551,516; 5,964,295; 5,979,555; 5,979,557; 6,140,277; 6,435,277; and 6,258,859, all of which are hereby incorporated by reference.

Vesicle-based fluids may be used, such as those described in U.S. Pat. No. 6,509,301, also hereby incorporated herein by reference.

In some cases, a certain amount of leak-off is desired, for example so that a tip screen-out occurs in fracturing, a condition in which the proppant forms a bridge, preferably at the end of the fracture away from the wellbore, stopping the lengthening of the fracture and resulting in a subsequent increase in the fracture width. For example, hydraulic fracturing followed by gravel-packing in a single operation, sometimes called a frac-pac, fracpac, frac pac, frac and pac, or StimPac, sometimes with a deliberate tip screen-out to generate a short wide fracture, is usually performed in relatively high permeability formations for sand-control purposes. However, such operations are sometimes performed in low permeability formations, occasionally for sand control, but also for other reasons, for example to bypass permeability damage near the wellbore caused by scaling or to improve upon poor communication between the wellbore and the formation or a previous fracture, or in formations in which perforating creates damaging fines, or for other reasons. Such jobs designed to generate short wide fractures may also be performed without subsequent gravel-packing when sand control is not an issue. The methods of the present Invention can be used in any of these cases (fracturing followed by gravel packing and/or fracturing for short wide fractures, in either case with or without deliberate tip screen-out).

The acid used in the matrix acidizing and acid fracturing methods of this invention can be any acid used in acid fracturing, including gelled, self-diverting, and delayed acids. Commonly used, but not limiting, acids are hydrochloric, hydrofluoric, fluoboric, acetic, and formic acids and mixtures thereof, and those acids in the form of oil external emulsions (for reaction rate retardation), or oil internal emulsions (for hydrocarbon solvency). The acids can contain additives such as corrosion inhibitors and chelants used to help dissolve rock components and keep them in solution. Gelled, self-diverting, and delayed acids can be gelled with suitable VES's.

Although in conventional propped fracturing the most common way to control fluid loss is to build an impermeable or reduced-permeability filtercake on the fracture walls (faces), in acid fracturing, especially with a low viscosity ungelled acid, pad viscosity is important for fluid loss control. On the other hand, if the acid is viscosified with a VES system, then if the VES has higher low-shear viscosity than high-shear viscosity, which is common, then as the VES leaks off a short distance into the formation, the flow rate decreases, the shear rate therefore decreases, and the fluid becomes more viscous. Such effects can reduce low viscosity ungelled acid leak-off better than a wallbuilding system that dissolves or decomposes in acid. In these cases, an acidic internal breaker would be particularly suitable in the pad. This allows acid treatment a certain selected depth into the formation and the acid then performs the very desirable function of diverting subsequent acid. Similarly, some acidic internal breakers may be used with viscoelastic diverting acids, which are acids containing certain viscoelastic surfactants, such that the fluid has low viscosity as formulated and injected, but increases in viscosity as the acid reacts with the formation, such as a carbonate. Examples of such systems were described in U.S. Pat. Nos. 6,399,546, 6,667,280, and 7,028,775 and U.S. Patent Application No. 2003-0119680, all hereby incorporated by reference.

Sometimes acid fracturing is performed with a series of alternating pad, acid, pad, acid, etc. stages in order to optimize coverage. The first non-acidic pad initiates a fracture for the first acid stage to follow. That first acid stage etches a portion of the fracture face. Subsequent stages of pad and acid repeat the process until the designed treatment volumes have been injected and the desired fracture has been created. In the past, this process has always used a gelled pad, such as one containing a viscoelastic surfactant system. The acidic internal breaker of the Invention may be used in at least the first pad and sometimes in all the pad stages. Similarly, matrix acidizing may be performed with alternating stages of acid and another fluid, such as a diverter, some or all of which may be viscosified; the acidic internal breaker of the Invention may be included in some or all of either the acid or the other fluid to break a viscosifier.

The acidic internal breakers of the invention may be added to a wellbore fluid by metering them in to the base water fluid as a concentrated liquid. If the material is received as an emulsion, dispersion, or slurry, it can be stored in that form and used in that form directly. If it is received in dry form (for example as a solid dispersible powder of fine particles or as a dry emulsion) the particles can be pre-dispersed in water or brine as required and metered in as a liquid stream, or alternatively they may be added as solids to the base fluid stream.

The reactivity of a given acidic internal breaker at a particular temperature and in contact with a viscosified fluid or fluids of a particular composition (for example pH and the concentration and nature of other components, especially electrolytes), is readily determined by a simple experiment: exposing the fluid or fluids to the acidic internal breaker under treatment conditions and monitoring the viscosity.

Although the acidic internal breakers of this Invention may be used with VES's made with any type of surfactant, or mixtures of surfactants, with or without one or more co-surfactants, and with or without other additives intended to stabilize or modify the properties of the micelles or vesicles (such as buffers, shear recovery additives, salts, and rheology boosters). Preferred VES's are cationic, anionic, amphoteric, and zwitterionic. Suitable VES's, for example, are described in the following U.S. patents, all of which are hereby incorporated in their entirety: U.S. Pat. Nos. 5,964,295; 5,979,557; 6,306,800; 6,637,517; and 6,258,859. The viscoelastic surfactant may be, for example, of the following formulae: R-Z, where R is the hydrophobic tail of the surfactant, which is a fully or partially saturated, linear or branched hydrocarbon chain of at least 14 carbon atoms and Z is the head group of the surfactant which may be for example $-NR_1R_2R_3^+$, $-SO_3^-$, $-COO^-$ or, in the case where the surfactant is zwitterionic, $-N^+(R_1)(R_2)R_3-COO^-$ where $R_1$, $R_2$ and $R_3$ are each independently hydrogen or a fully or partially saturated, linear or branched, aliphatic chain of at least one carbon atom; and where $R_1$ or $R_2$ may comprise a hydroxyl terminal group.

Cleavable viscoelastic surfactants, for example of the following formula, may be used, as disclosed in International Patent Application WO02/064945: R—X—Y-Z, where R is the hydrophobic tail of the surfactant, which is a fully or partially saturated, linear or branched hydrocarbon chain of at least 18 carbon atoms, X is the cleavable or degradable group of the surfactant which is an acetal, amide, ether or ester bond, Y is a spacer group which is a short saturated or partially saturated hydrocarbon chain of n carbon atoms where n is at least equal to 1, preferably 2 and, when n is equal to or greater than 3, the chain may be a straight or branched saturated or partially saturated chain, and Z is the head group of the surfactant which can $NR_1R_2R_3^+$, $-SO_3^-$, $-COO^-$ or, in the case where the surfactant is zwitterionic, $-N^+(R_1R_2R_3-COO^-)$ where R1, R2 and R3 are each independently hydrogen or a fully or partially saturated, linear or branched, aliphatic chain of at least one carbon atom, possibly comprising a hydroxyl terminal group. Due to the presence of the cleavable or degradable group, cleavable surfactants are able to degrade under downhole conditions.

A nonlimiting example of a suitable cationic viscoelastic surfactant useful for the implementation of the Invention is N-erucyl-N,N-bis(2-hydroxyethyl)-N-methyl ammonium chloride. Nonlimiting examples of some suitable anionic viscoelastic surfactants useful for the implementation of the Invention are monocarboxylates RCOO$^-$ such as oleate where R is $C_{17}H_{33}$ or di- or oligomeric carboxylates such as those disclosed in International Patent Application WO 02/11874.

The acidic breakers of this invention have been found to be particularly useful breakers when used with several types of zwitterionic surfactants. In general, suitable zwitterionic surfactants have the formula:

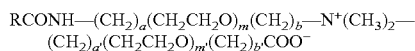

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be oriented as $OCH_2CH_2$. Preferred surfactants are betaines and amidoamine oxides.

Two examples of betaines are oleylamidopropyl dimethyl betaine and erucylamidopropyl dimethyl betaine. Oleylamidopropyl dimethyl betaine contains an oleyl acid amide group (including a $C_{17}H_{33}$ alkene tail group); erucylamidopropyl dimethyl betaine contains an erucic acid amide group (having a $C_{21}H_{41}$ tail group). Betaine surfactants, and others that are suitable, are described in U.S. Pat. No. 6,258,859.

Although the invention has been described throughout using the term "VES", or "viscoelastic surfactant" to describe the non-polymeric viscosified aqueous fluid, any non-polymeric material may be used to viscosify the aqueous fluid provided that the requirements described herein for such a fluid are met, for example the required viscosity, stability, compatibility, and lack of damage to the wellbore, formation or fracture face. Examples, without regard to whether they form, or are described as forming, vesicles or viscoelastic fluids, include, but are not limited to, those viscosifiers described in U.S. Pat. No. 6,035,936 and in GB application No. 2,366,307A.

Also optionally, fracturing fluids may contain materials designed to assist in proppant transport and/or to limit proppant flowback after the fracturing operation is complete by forming a porous pack in the fracture zone. Such materials can be any known in the art, such as are available from Schlumberger under the tradename PropNET™ (for example see U.S. Pat. No. 5,501,275). Exemplary proppant flowback inhibitors include fibers or platelets of novoloid or novoloid-type polymers (U.S. Pat. No. 5,782,300).

The choice of acidic internal breaker is based primarily on the desired time before the delayed break, which will depend upon the choice and concentration of VES and the temperature, and may depend upon the size of the job, the nature of the job, and other factors known to those of ordinary skill in the art. Similarly, appropriate delay agents or accelerating agents and their concentrations may be determined by simple laboratory experiments, for example mixing all the components, heating to the job temperature, and monitoring the viscosity. A requirement is compatibility of the water with the VES system and with the acidic internal breaker. The system comprising an acidic internal breaker also works with VES systems that contain co-surfactants or other additives commonly included in oilfield treatment fluids. Again, a requirement is compatibility of the acidic internal breaker, the VES system, and the other components. The fluid containing an acidic internal breaker may be batch-mixed or mixed on-the-fly.

Any additives normally used in such treatments may be included, again provided that they are compatible with the other components and the desired results of the treatment. Such additives can include, but are not limited to, corrosion inhibitors, delay agents, biocides, buffers, fluid loss additives, etc. The wellbores treated can be vertical, deviated or horizontal. They can be completed with casing and perforations or open hole.

In gravel packing, or combined fracturing and gravel packing, it is within the scope of the Invention to apply the compositions and methods of the Invention to treatments that are done with or without a screen. Although treatments are normally done to promote hydrocarbon production, it is within the scope of the Invention to use the compositions and methods of the invention in wells intended for the production of other fluids such as carbon dioxide, water or brine, or in injection wells. Although we have described the Invention in terms of unfoamed fluids, fluids foamed or energized (for example with nitrogen or carbon dioxide or mixtures thereof) may be used. Adjustment of the appropriate concentrations due to any changes in the fluid properties (or other parameters, such as proppant concentration) consequent to foaming would be made.

EXAMPLES

Base Fluids: All fluids were evaluated in a Fann50-type Rheometer or Bohlin Rheometer. This instrument requires about 5-20 minutes to reach test temperature, so that the early portion of the data reflects heating to the final temperature. The instrument sometimes showed small regular fluctuations around the intended temperature, so small oscillations in the observed viscosities in some figures reflect that occurrence. A standard procedure is used for the Fann50 measurements, where the viscosity is measured at a shear rate of 100 s$^{-1}$ with ramps down to 75 s$^{-1}$, 50 s$^{-1}$ and 25 s$^{-1}$ every 15 min. A heating time of 15 or 30 min was applied for the fluid to reach the test temperature. More accurate viscosity measurements were obtained on the Bohlin rheometers over a shear rate range between 0.01 s$^{-1}$ and 100 s$^{-1}$. Note that fluctuations in viscosities obtained on Bohlin rheometers are generally signatures of very low, water-like viscosities, where the equipment limitations are reached.

Experiments were performed in which a viscoelastic fluid was heated to and held, usually at 104° C. (219° F.) or 93.3° C. (200° F.), with and without breakers and other additives as noted.

Base Fluid in 1.39 kg/L CaCl2 brine at 104° C. (219° F.). FIG. 1 shows a base VES fluid consisting of 1.39 kg/L CaCl2 brine, 6.5 vol % aqueous solution of erucic amidopropyl dimethyl betaine, and 0.2 vol % 2-Butoxyethanol. The plot shows VES with no other additive.

Example 1

Figure 2:
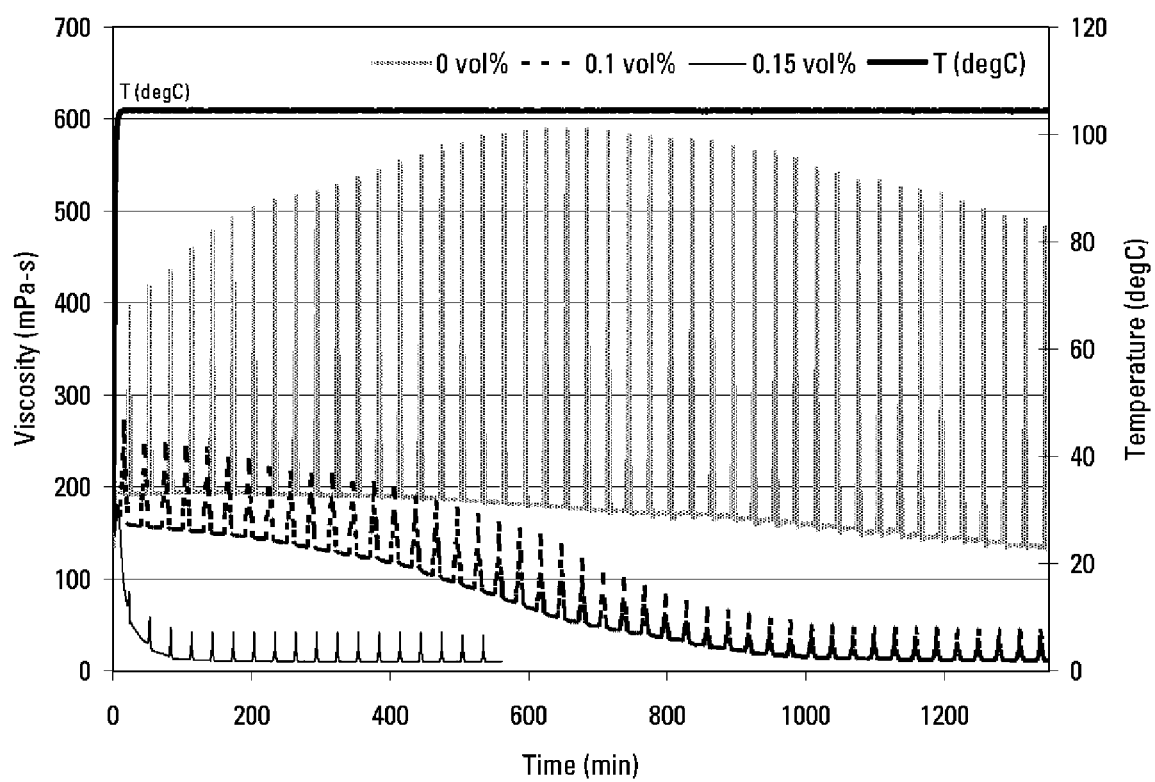
FIG. 2 shows the viscosity vs. time of a VES fluid containing 1.43 kg/L NaBr brine, 6.5 vol % of an aqueous solution of erucic amidopropyl dimethyl betaine, and 0.2 vol % 2-Butoxyethanol, containing a sulfuric acid internal breaker (3M sulfuric acid solution) at concentrations of 0, 0.1 vol %, and 0.15 vol %, respectively at 104° C. (219° F.).

This Example demonstrates the use of sulfuric acid as an acidic internal breaker. The changes in the viscosity over time of a VES fluid containing 1.43 kg/L NaBr brine, 6.5 vol % of an aqueous solution of erucic amidopropyl dimethyl betaine, and 0.2 vol % 2-Butoxyethanol, and containing a sulfuric acid internal breaker (3M sulfuric acid solution) at concentrations of 0 (served as the baseline), 0.1 vol %, and 0.15 vol %, respectively, at 104° C. (219° F.) were measured and as shown in FIG. 2, the breaking time is tunable by varying the breaker concentration; as the concentration of the breaker increased, the breaking time decreased consistently.

Example 2

Figure 3:
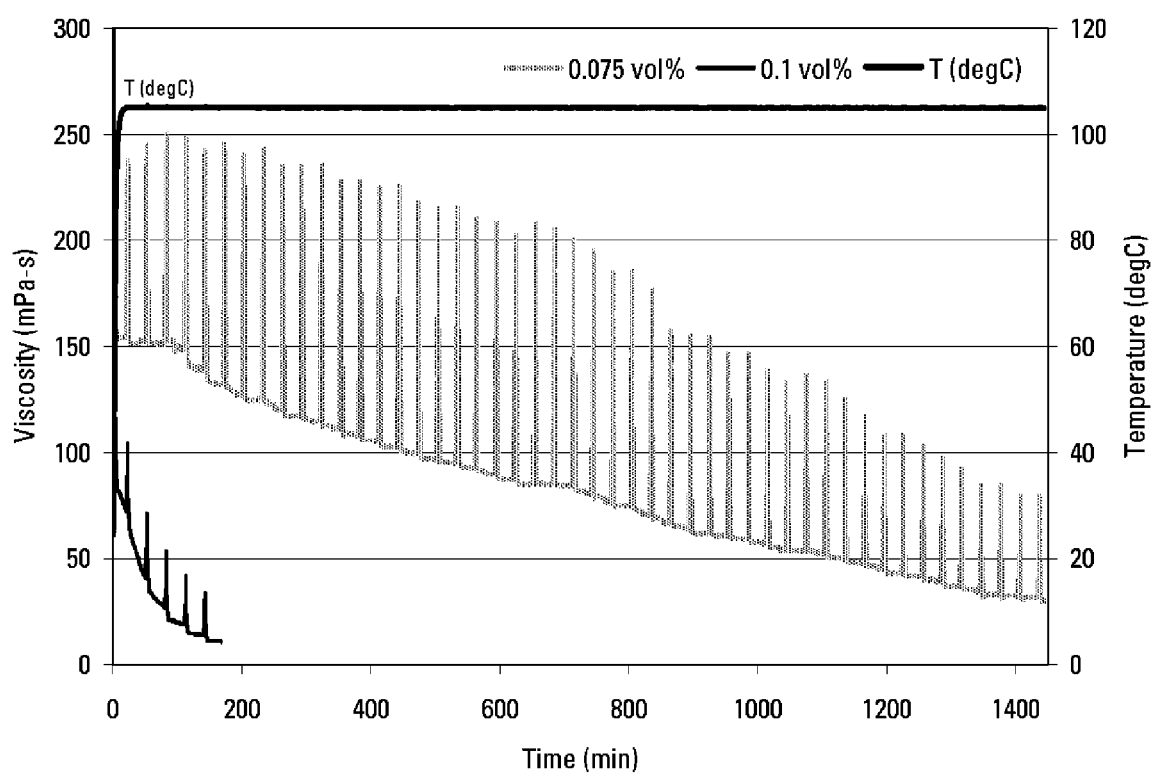
FIG. 3 shows the viscosity vs. time of the base VES fluid containing 1.43 kg/L NaBr brine, 6.5 vol % aqueous solution of erucic amidopropyl dimethyl betaine, and 0.2 vol % aqueous solution of alkyl (C12-16) dimethyl benzyl ammonium chloride containing the internal breaker (3M sulfuric acid solution) at concentrations of 0.075 vol % and 0.1 vol %, respectively, at 104° C. (219° F.).

This Example demonstrates that the viscoelastic fluid formula can be adjusted according to the fluid requirement. The viscosity changes over time of the base VES fluid containing 1.43 kg/L NaBr brine, 6.5 vol % aqueous solution of erucic amidopropyl dimethyl betaine, and containing 0.2 vol % aqueous solution of alkyl (C12-16) dimethyl benzyl ammonium chloride in place of the 2-butoxyethanol was also broken using the internal breaker (3M sulfuric acid solution) at concentrations of 0.075 vol % and 0.1 vol %, respectively, at 104° C. (219° F.). As can be seen in FIG. 3, the breaking time decreased with increased breaker concentration consistently for this composition as well.

Example 3

Figure 4:
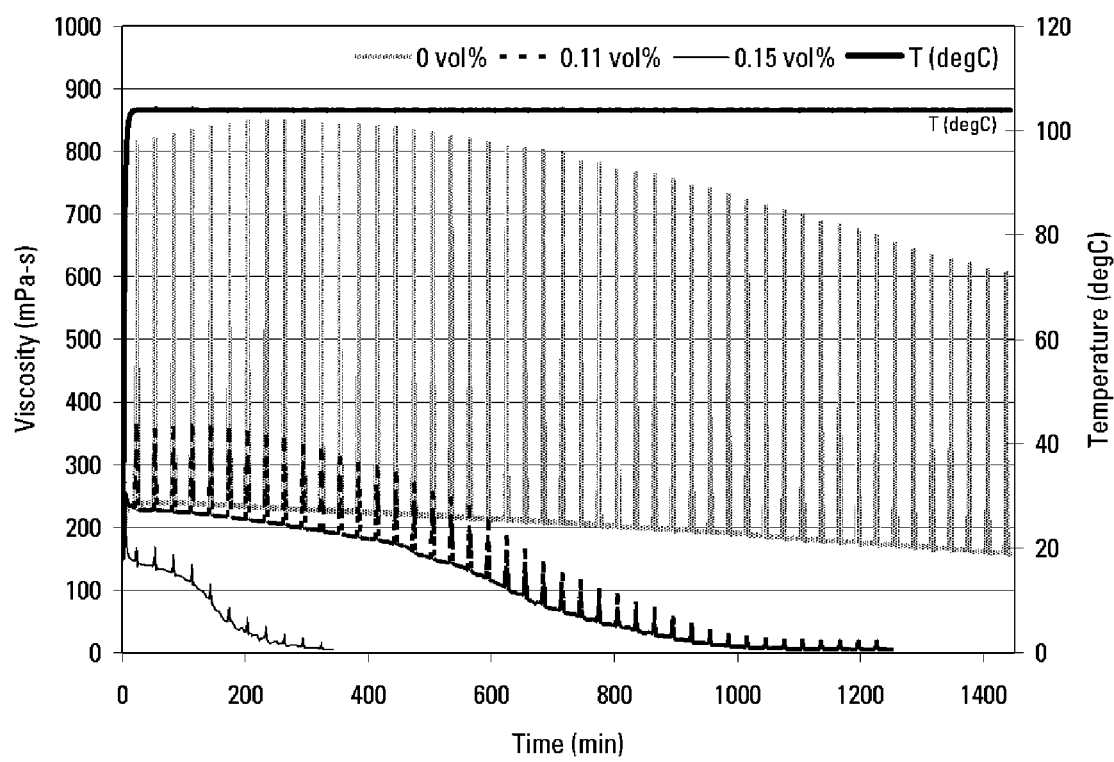
FIG. 4 shows the viscosity versus time of a gel containing 1.43 kg/L NaBr and 8 vol % aqueous solution of erucic amidopropyl dimethyl betaine, containing the sulfuric acid internal breaker (3M sulfuric acid solution) at concentrations of 0, 0.11 vol %, and 0.15 vol %, respectively, at 104° C. (219° F.).

This Example demonstrates that the concentration of the viscosifier in the fluid can be varied. A group of gels prepared from 1.43 kg/L NaBr, 8 vol % aqueous solution of erucic amidopropyl dimethyl betaine, and various concentrations of internal breaker (3M sulfuric acid solution), 0-0.2 vol %, were tested. In FIG. 4, the representative rheology curves are shown for gels containing the breaker at concentrations of 0 (as the baseline), 0.11 vol %, and 0.15 vol %, respectively. Again, as the concentration of the breaker increased, the breaking time decreased consistently Example 4

Figure 5:
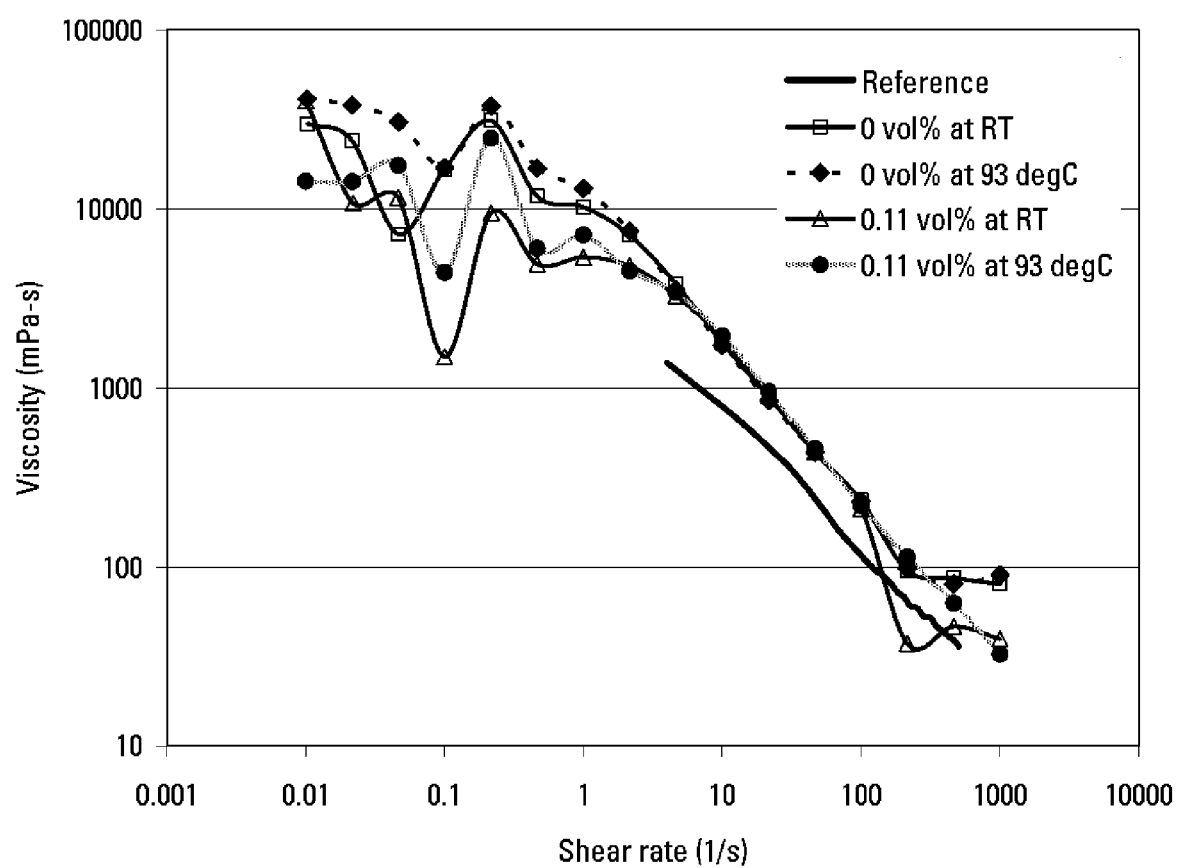
FIG. 5 shows the viscosity as a function of shear rate for a VES fluid containing 1.43 kg/L NaBr and 8 vol % aqueous solution of erucic amidopropyl dimethyl betaine, containing 0 and 0.11 vol % of 3M sulfuric acid solution as the internal breaker at RT and 93° C. (200° F.), respectively.

Sand settling tests were carried out at 93° C. with 0.48 kg of Econo 30/50 proppant added per liter of fluid in a 500 ml graduated cylinder. The gel used in the sand settling tests was prepared with 1.43 kg/L NaBr brine, 8 vol % aqueous solution of erucic amidopropyl dimethyl betaine, and containing the sulfuric acid internal breaker (3M sulfuric acid solution) at the concentration of 0.125 vol %. The time taken to reach 20% settled sand was between 50 and 60 minutes, which is consistent with the Bohlin test results. FIG. 5 shows the shear rate vs. time for these fluids.

Example 5

Figure 6:
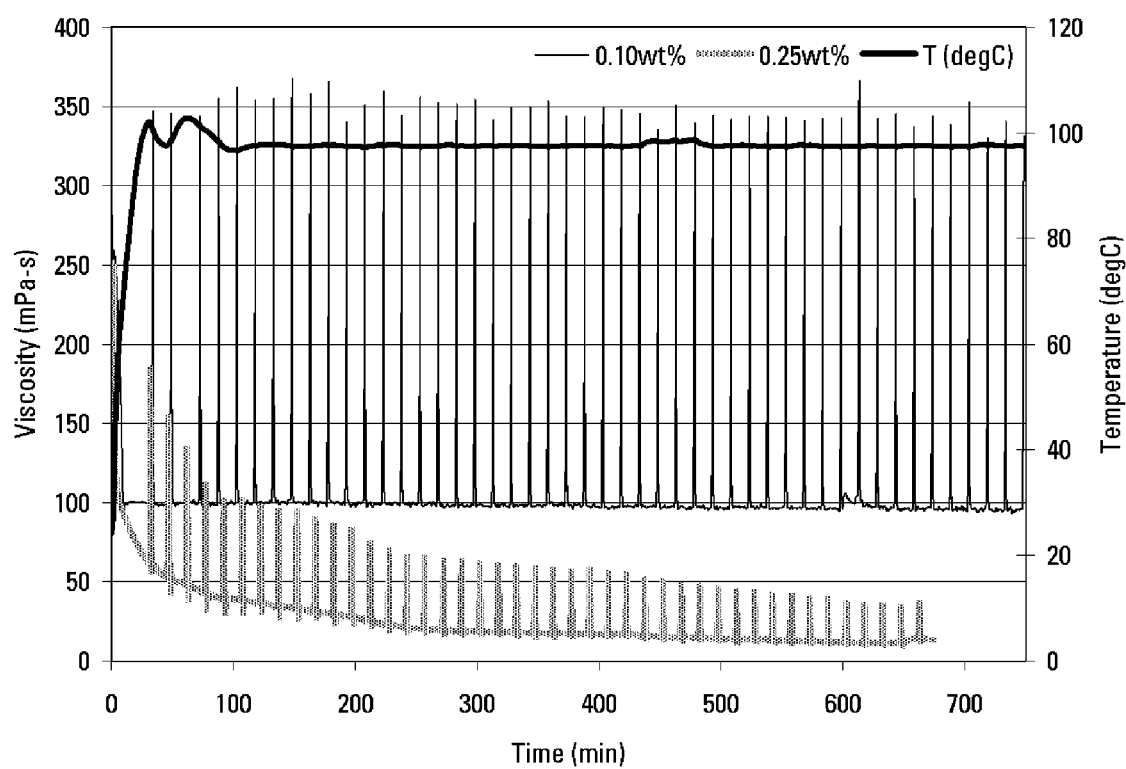
FIG. 6 shows the viscosity as a function of time at for VES fluids containing 1.43 kg/L NaBr and 6 vol % aqueous solution of erucic amidopropyl dimethyl betaine, containing the internal breaker (D-isoascorbic acid) at concentrations of 0.10 wt % and 0.25 wt %, respectively at 93.3° C. (200° F.).

This Example uses D-isoascorbic acid as the internal acidic breaker. FIG. 6 shows the viscosity as a function of shear rate for a VES fluid containing 1.43 kg/L NaBr and 6 vol % aqueous solution of erucic amidopropyl dimethyl betaine, containing 0.10 and 0.25 wt % of D-isoascorbic acid as the internal breaker at 100° C. (212° F.). In FIG. 6, the gel containing 0.25 wt % of the breaker has a much shorter breaking time, showing that breaking time can be adjusted by varying the D-isoascorbic acid concentration. Viscosity reduction or breaking was also observed when 2 wt % KCl was used as the brine.

Example 6

Figure 7:
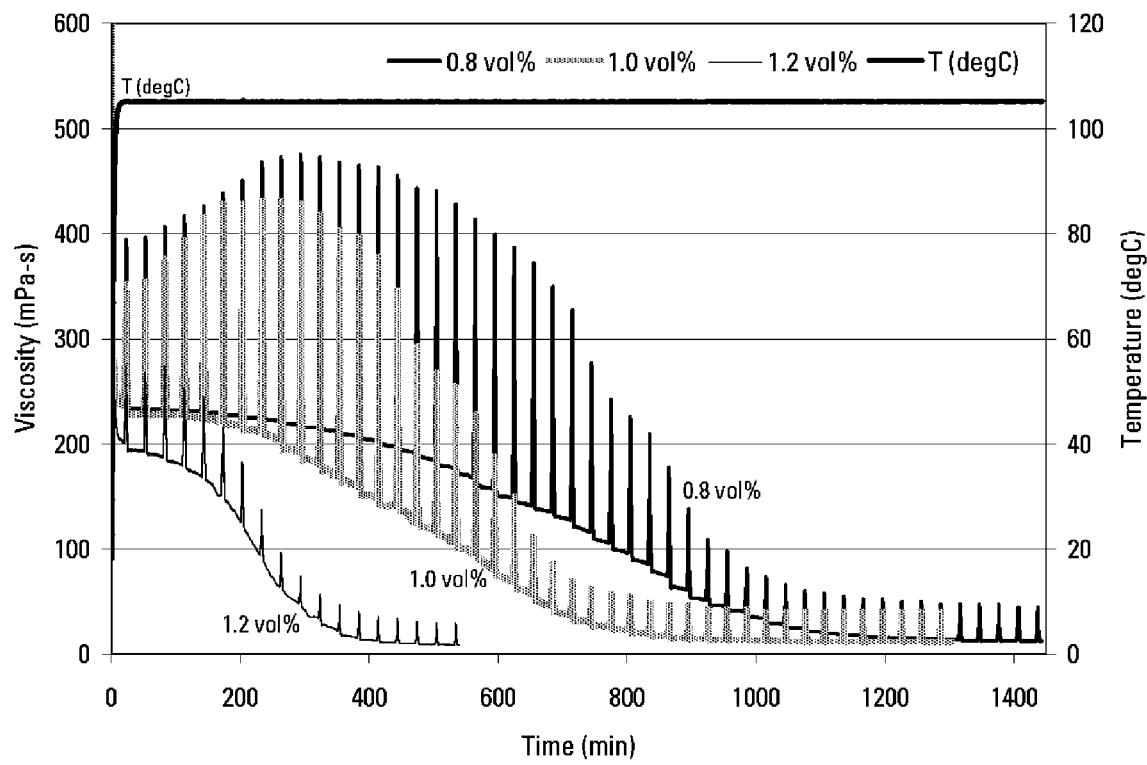
FIG. 7 shows the viscosity as a function of time for VES fluids containing 1.39 kg/L CaCl2 brine, 6.5 vol % aqueous solution of erucic amidopropyl dimethyl betaine, and 0.2 vol % 2-Butoxyethanol, containing the internal breaker (1.57M nitric acid solution) at concentrations of 0.8 vol %, 1.0 vol %, and 1.2 vol %, respectively at 104° C. (219° F.).

This Example demonstrates the use of acidic internal breakers in calcium ion ($Ca^{2+}$) containing brines. The fluids mentioned in this section are prepared with brines that contain Ca2+ ions. The brines include, but not limited to CaCl2, CaBr2, and the combinations. FIG. 7 shows the viscosity as a function of time at for VES fluids containing 1.39 kg/L CaCl2, 6.5 vol % aqueous solution of erucic amidopropyl dimethyl betaine, and 0.2 vol % 2-Butoxyethanol, and containing the acidic internal breaker (1.57M nitric acid solution) at concentrations of 0.8 vol %, 1.0 vol %, and 1.2 vol %, respectively at 104° C. (219° F.). As the concentration of the acidic internal breaker was increased, the breaking time decreased consistently.

Example 7

Figure 8:
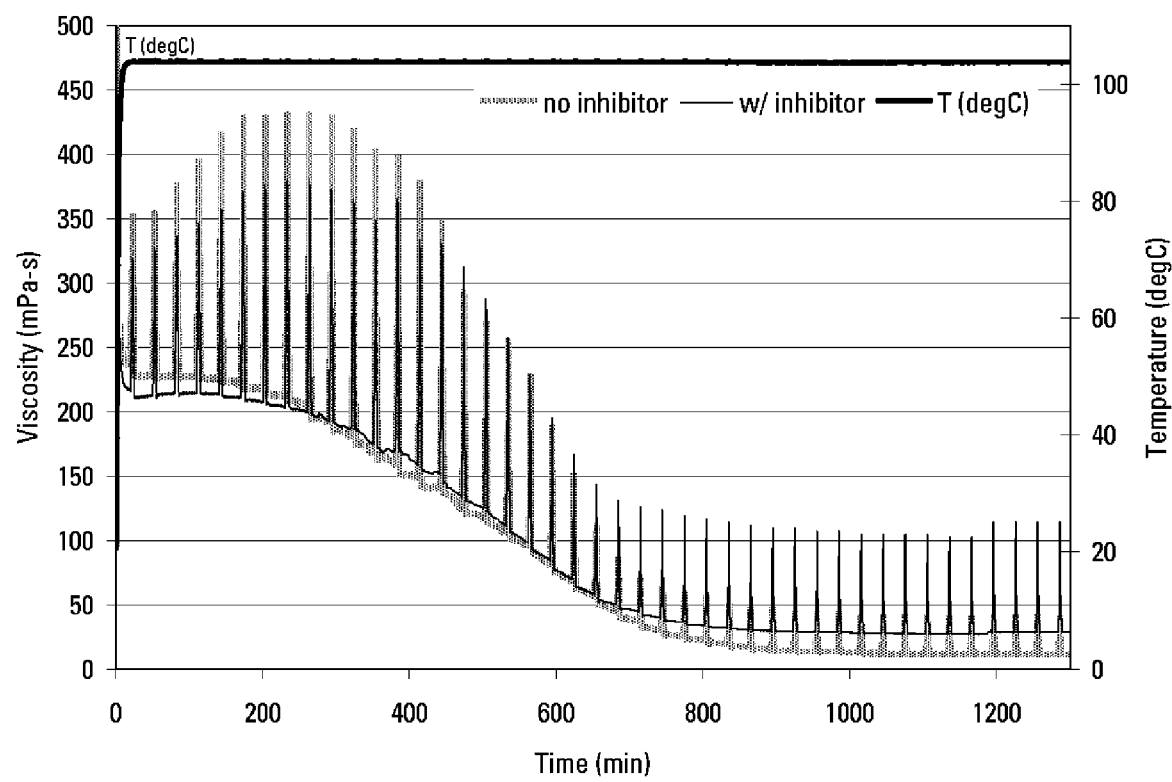
FIG. 8 shows the viscosity as a function of time for VES fluids containing 1.39 kg/L CaCl2 brine, 6.5 vol % aqueous solution of erucic amidopropyl dimethyl betaine, 0.2 vol % 2-Butoxyethanol, and 1 vol % 1.57M nitric acid with and without the addition of 0.1 vol % acid corrosion inhibitor at 104° C. (200° F.).

This Example demonstrates that the gel formula was found to be compatible with acid corrosion inhibitors. In the example shown in FIG. 8, one gel was prepared with 1.39 kg/L CaCl2 brine, 6.5 vol % aqueous solution of erucic amidopropyl dimethyl betaine, 0.2 vol % 2-Butoxyethanol, and 1 vol % 1.57M nitric acid solution as the internal breaker. The other gel has the same composition plus 0.1 vol % selected acid corrosion inhibitor, a typical dosage for this corrosion inhibitor. The rheology curves of the two gels tested with Fann50 at 104° C. (219° F.) nearly trace each other in FIG. 8, suggesting that the inhibitor has no obvious adverse effect on the fluid property.

Example 8

Figure 9:
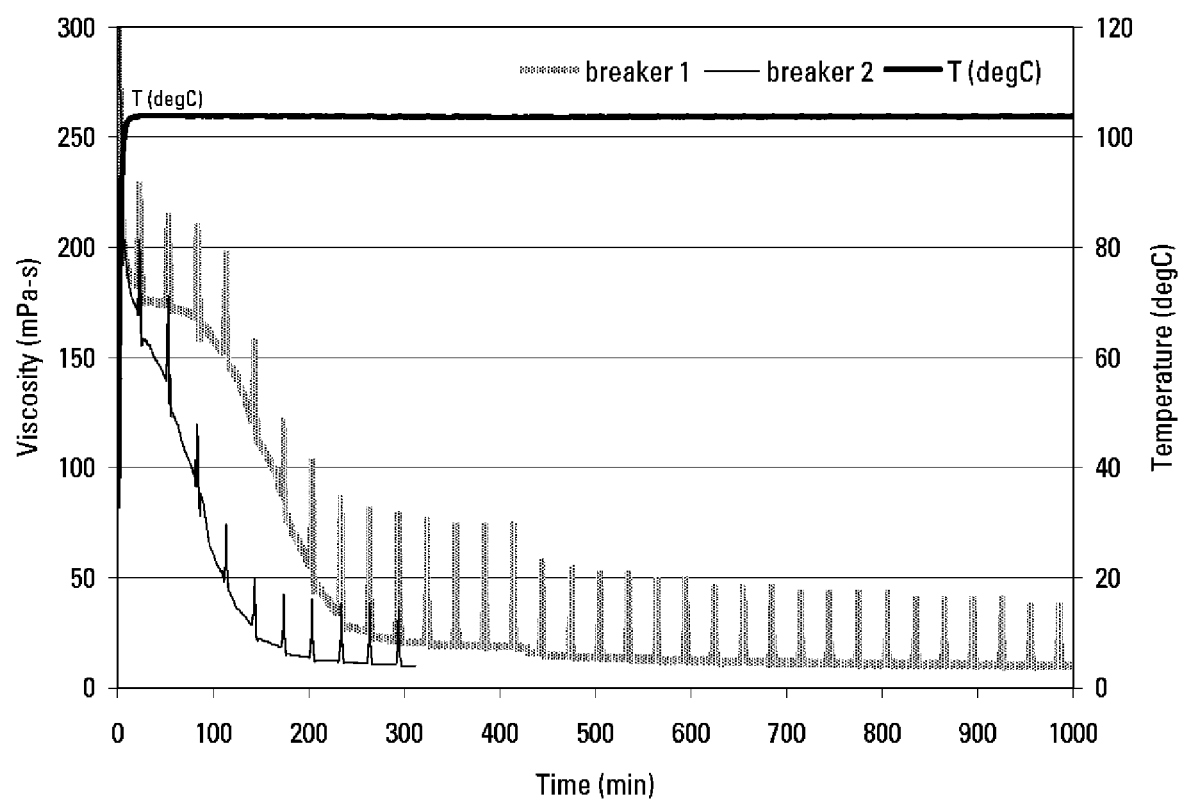
FIG. 9 shows the viscosity as a function of time for a VES fluid containing 1.39 kg/L CaCl2 brine, 6.5 vol % aqueous solution of erucic amidopropyl dimethyl betaine, and 0.2 vol % 2-Butoxyethanol with the addition of the internal breaker 1 (0.52 vol % 3M HCl and 0.13 wt % NaNO3) and the breaker 2 (0.83 vol % 3M HCl and 0.21 wt % NaNO3), respectively, at 104° C. (219° F.).

This Example demonstrates that nitrates combined with acids, can function as the acidic internal breakers for fluids in a similar way as nitric acid. In the example shown in FIG. 9, gels were prepared with 1.39 kg/L CaCl2 brine, 6.5 vol % aqueous solution of erucic amidopropyl dimethyl betaine, and 0.2 vol % 2-butoxyethanol. One gel contained the internal breaker 1 consisting of 0.52 vol % 3M HCl and 0.13 wt % NaNO3, and the other gel contained the breaker 2 consisting of 0.83 vol % 3M HCl and 0.21 wt % NaNO3. The rheology curves of the two gels were tested with Fann50 at 104 degC., showing that the higher dose of breaker (breaker 2) leads to faster breaking time.

Example 9

Figure 10:
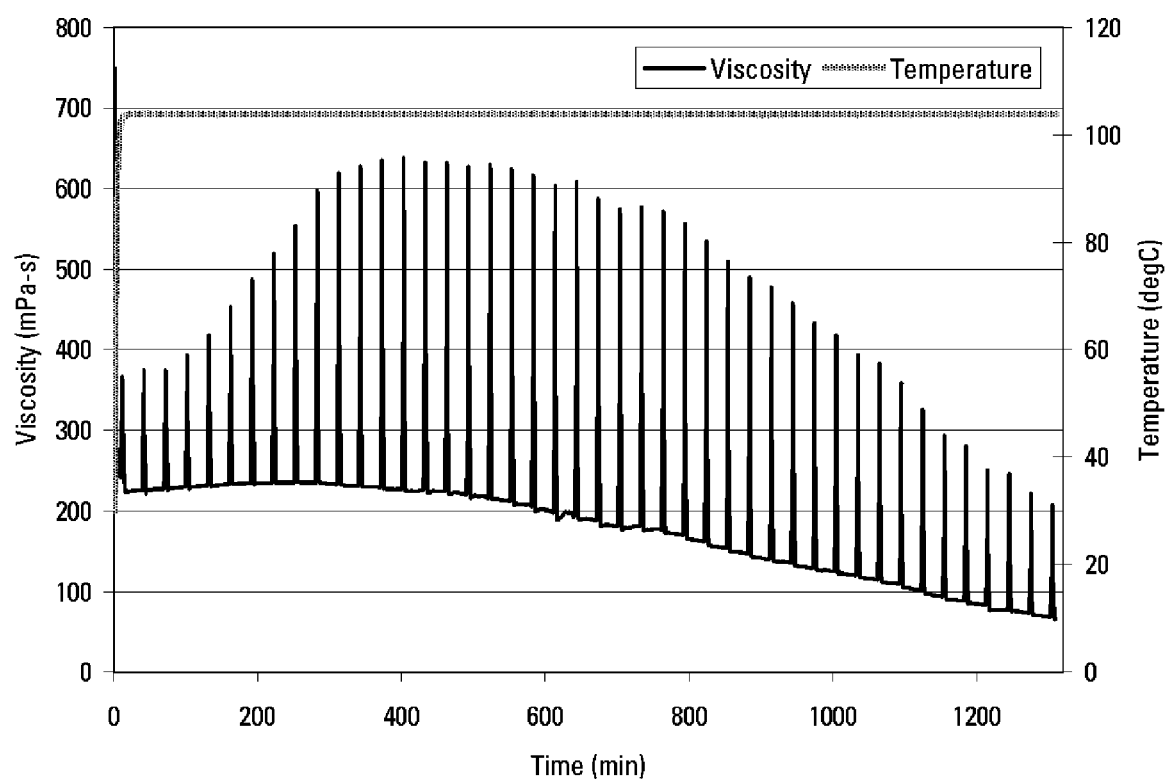
FIG. 10 shows the viscosity as a function of time for a VES fluid containing 1.39 kg/L CaCl2 brine, 6.5 vol % aqueous solution of erucic amidopropyl dimethyl betaine, and 0.2 vol % 2-Butoxyethanol with the addition of the internal breaker (0.4 vol % 8.3M acetic acid solution) at 104° C. (219° F.).

This Example demonstrates the use of acidic internal breakers in calcium ion ($Ca^{2+}$) containing brines. The fluids mentioned here are prepared with brines that contain Ca2+ ions. FIG. 10 shows the viscosity as a function of time at for VES fluids containing 1.39 kg/L CaCl2, 6.5 vol % aqueous solution of erucic amidopropyl dimethyl betaine, and 0.2 vol % 2-butoxyethanol, and containing the acidic internal breaker (8.33M acetic acid solution) at the concentration of 0.4 vol % at 104° C. (219° F.).

Example 10

Figure 11:
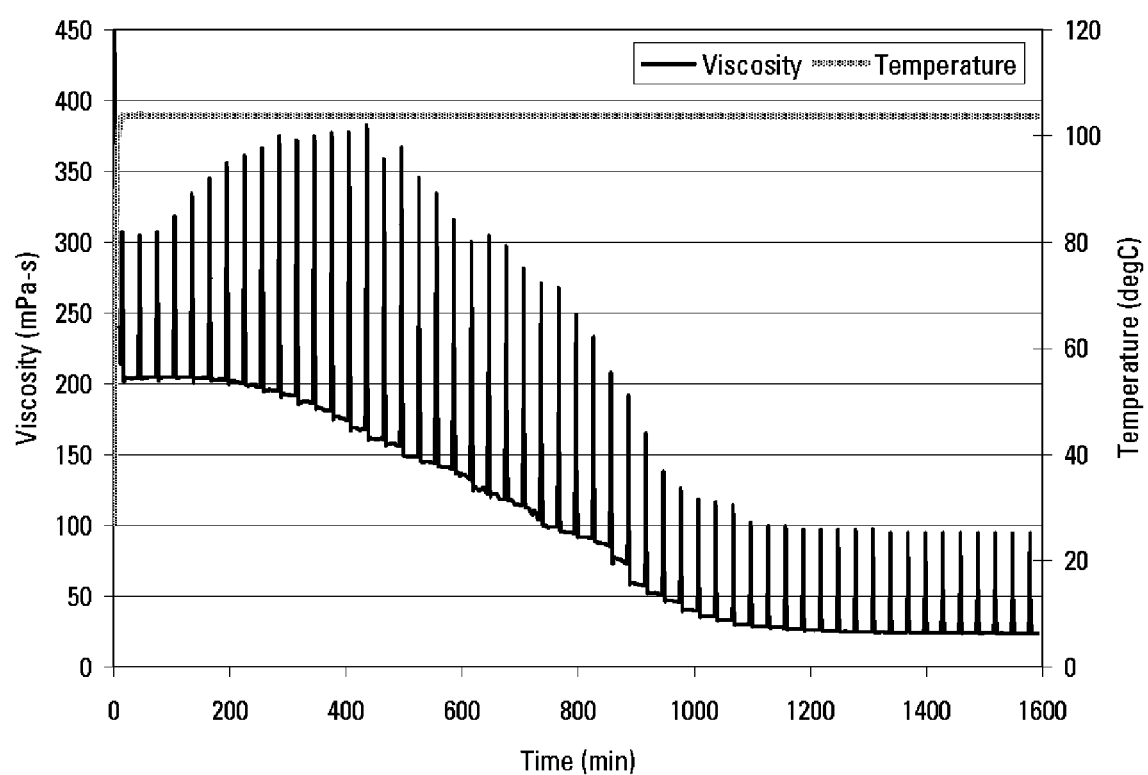
FIG. 11 shows the viscosity as a function of time for a VES fluid containing 1.39 kg/L CaCl2 brine, 6.5 vol % aqueous solution of erucic amidopropyl dimethyl betaine, and 0.2 vol % 2-Butoxyethanol with the addition of the internal breaker (0.52 vol % 3M HCl solution) at 104° C. (219° F.).

This Example demonstrates the use of acidic internal breakers in calcium ion ($Ca^{2+}$) containing brines. The fluids mentioned here are prepared with brines that contain Ca2+ ions. FIG. 11 shows the viscosity as a function of time at for VES fluids containing 1.39 kg/L CaCl2, 6.5 vol % aqueous solution of erucic amidopropyl dimethyl betaine, and 0.2 vol % 2-butoxyethanol, and containing the acidic internal breaker (3M HCl solution) at the concentration of 0.52 vol % at 104° C. (219° F.).

Example 11

This Example demonstrates that polythionates including sodium tetrathionate dehydrate (Na2S4O6.2H2O) can be used as a latent acid internal breaker for VES fluids. Decomposition of sodium tetrathionate generates acidic species when the gel is broken. Viscosity of similar VES fluids can be gradually reduced over time and that the break time can be well controlled by the tetrathionate concentration at a given temperature.

It should be understood that only a few examples have been shown for the use of tested breakers with a specific VES, at specific concentrations, in specific brines, at specific temperatures, and with or without specific accelerators and retarders at specific concentrations. The fact that a specific breaker was observed to be suitable or not in a specific case should not be taken as being a general conclusion for that breaker. It is believed that all breakers will be suitable under certain conditions. As usual, laboratory testing should be done to determine the optimal use parameters for each breaker in each fluid at each condition.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment. Furthermore, the described features, advantages, and characteristics of the invention may be combined in any suitable manner in one or more embodiments.

What is claimed is:

1. A method of treating a subterranean formation penetrated by a wellbore comprising a) injecting into the pores of the formation an aqueous gel comprising a brine, a non-polymeric viscosifier and an acidic internal breaker soluble in the gel, and b) allowing said gel to lose viscosity in the pores after the injection, wherein said gel comprises from about 0.01 wt% to about 1 wt% of said acidic internal breaker.

2. The method of claim 1 wherein said aqueous gel further comprises a brine containing substantially only monovalent ions selected from the group consisting of KBr, NaBr, KCl, CsCl, CsBr, Na formate, K Formate, Cs Formate and NaCl.

3. The method of claim 2 wherein said acidic internal breaker is selected from the group consisting of sulfuric acid, sulfurous acid, methanesulfonic acid, and a combination of a sulfate and an acid.

4. The method of claim 1 wherein said brine comprises at least one divalent ion selected from the group consisting of $CaBr_2$, $ZnCl_2$, $ZnBr_2$, and $CaCl_2$.

5. The method of claim 4 wherein the acidic internal breaker is selected from the group consisting of nitric acid and a combination of a nitrate and an acid.

6. The method of claim 5 wherein said acidic internal breaker is selected from the group consisting of NaNO3 in combination with an acid and KNO3 in combination with an acid.

7. The method of claim 1 wherein said non-polymeric viscosifier comprises a viscoelastic surfactant selected from zwitterionic surfactants and cationic surfactants.

8. The method of claim 7 wherein said zwitterionic surfactant comprises a betaine.

9. The method of claim 7 wherein said viscoelastic surfactant comprises an amine oxide surfactant.

10. The method of claim 1 wherein said acidic internal breaker is selected from the group consisting of hydrochloric acid, acetic acid, acetates with acids, and phosphoric acid.

11. The method of claim 1 wherein said gel further comprises a corrosion inhibitor.

* * * * *